United States Patent
Schammel et al.

(10) Patent No.: US 9,770,761 B2
(45) Date of Patent: Sep. 26, 2017

(54) TOOL BIT APPARATUS, SYSTEM, AND METHOD FOR CUTTING AN OBJECT

(71) Applicant: Mactech, Inc., Red Wing, MN (US)

(72) Inventors: Sam Schammel, Hager City, WI (US); Joel Kent Wittenbraker, Red Wing, MN (US)

(73) Assignee: MACTECH, INC., Red Wing, MN (US)

( * ) Notice: Subject to any disclaimer, the term of this patent is extended or adjusted under 35 U.S.C. 154(b) by 339 days.

(21) Appl. No.: 13/973,150

(22) Filed: Aug. 22, 2013

(65) Prior Publication Data

US 2015/0053055 A1 Feb. 26, 2015

(51) Int. Cl.
| | |
|---|---|
| B23D 21/04 | (2006.01) |
| B23B 3/26 | (2006.01) |
| B23B 5/16 | (2006.01) |
| B23B 27/04 | (2006.01) |
| B23B 27/06 | (2006.01) |

(52) U.S. Cl.
CPC .............. *B23B 3/26* (2013.01); *B23B 5/163* (2013.01); *B23B 27/045* (2013.01); *B23B 27/06* (2013.01); B23B 2200/205 (2013.01); B23B 2260/132 (2013.01); Y10T 83/04 (2015.04); Y10T 83/0524 (2015.04); Y10T 83/667 (2015.04); Y10T 83/9319 (2015.04); Y10T 83/9326 (2015.04)

(58) Field of Classification Search
CPC .............. Y10T 408/04; Y10T 408/905; Y10T 408/907; Y10T 408/906; Y10T 408/9065; Y10T 407/00; Y10T 407/10; Y10T 407/118; Y10T 407/1906; Y10T 407/1908; Y10T 407/1924; Y10T 407/1946; Y10T 407/1948; Y10T 407/2268; Y10T 407/23; Y10T 407/24; Y10T 407/26; Y10T 82/22; Y10T 82/2529; Y10T 83/9319; Y10T 83/9324; Y10T 83/667; Y10T 83/674; Y10T 83/68; B23B 5/16; B23B 5/161; B23B 5/163; B23B 2200/00; B23B 2200/04; B23B 2200/12; B23B 2200/128; B23B 2200/167; B23B 2200/242; B23B 2210/06; B23B 2215/72; B23D 21/12; B23D 21/04; E21B 10/42; E21B 11/06
USPC ........................................ 175/408, 413, 421
See application file for complete search history.

(56) References Cited

U.S. PATENT DOCUMENTS

| | | |
|---|---|---|
| 482,103 A | 9/1892 | Speer |
| 1,420,950 A | 6/1922 | Elder |
| (Continued) | | |

OTHER PUBLICATIONS

International Searh Report; Jan. 21, 2015; PCT/US14/50081; International Searching Authority.
U.S. Appl. No. 13/950,793, Harper et al.

*Primary Examiner* — Phong Nguyen
(74) *Attorney, Agent, or Firm* — Lempia Summerfield Katz LLC

(57) ABSTRACT

A system, a method and a cutting apparatus may use a bit to cut an object. The apparatus may have a bit connected to a cutting block on a cutting apparatus. The cutting apparatus may rotate about the object while the bit may advance into the object to cut the object. The cutting apparatus may have another bit located opposite to the bit to bevel an edge of the object. The cutting system may reduce point loads and/or provide an equalized load. The cutting system may reduce tool pressures when cutting a pipe and may provide extended tool and/or bit life.

5 Claims, 12 Drawing Sheets

(56) References Cited

U.S. PATENT DOCUMENTS

| | | | |
|---|---|---|---|
| 2,141,504 A * | 12/1938 | Balfour | B23D 61/121 83/846 |
| 3,168,002 A | 2/1965 | Walling | |
| 3,835,901 A | 9/1974 | Jonsson | |
| 4,123,194 A * | 10/1978 | Cave | B23B 27/065 407/6 |
| 4,499,958 A | 2/1985 | Radtker et al. | |
| 5,329,562 A | 7/1994 | Kubo et al. | |
| 5,361,748 A | 11/1994 | Matteucci | |
| 5,524,517 A | 6/1996 | Robinson | |
| 5,560,440 A | 10/1996 | Tibbits | |
| 5,597,041 A | 1/1997 | Robinson | |
| 6,267,037 B1 | 7/2001 | McCoy, Jr. et al. | |
| 6,279,564 B1 | 8/2001 | Hodsden et al. | |
| 6,401,585 B1 * | 6/2002 | Morgan | B23D 61/123 30/501 |
| 6,881,131 B2 | 4/2005 | Parsells et al. | |
| 7,036,599 B2 | 5/2006 | Matteucci | |
| 7,127,979 B2 * | 10/2006 | Kocher | B23D 61/121 83/835 |
| D534,401 S * | 1/2007 | Duffin | B23D 61/126 D8/20 |
| D565,369 S * | 4/2008 | Dawson | D8/20 |
| 2007/0028451 A1 | 2/2007 | Kaehr et al. | |
| 2007/0267006 A1 | 11/2007 | Ogyu | |
| 2008/0022830 A1 | 1/2008 | Lawler et al. | |
| 2008/0304915 A1 | 12/2008 | Bang | |
| 2011/0087464 A1 | 4/2011 | Hall et al. | |
| 2011/0214543 A1 | 9/2011 | Shae et al. | |

* cited by examiner

TOOL BIT APPARATUS, SYSTEM, AND METHOD FOR CUTTING AN OBJECT

BACKGROUND OF THE INVENTION

The present invention generally relates to a cutting system, method and apparatus. More specifically, the present invention relates to a cutting apparatus having bits to cut an object.

Known systems exist for cutting pipe and/or other objects. Further, loose pipes and/or pipes that are installed and/or integrated on-site in an industrial setting may also require certain cutting tools and/or methods. The pipes may be cut on-site when new fittings and/or equipment may be added to an existing installation. Also, in-line equipment and/or connections may be removed from an installation due to a failure and/or a desired change in the current design and/or installation. Thus, the on-site pipes may require that a cutting apparatus is portable. For example, a valve and/or meter may be installed and/or removed in-line with the existing pipe installation.

In certain applications, the cutting apparatus may be delivered to the location to cut the pipe on-site. Certain cutting systems may cut the pipe in a saw-like manner. However, other cutting systems may operate in the same general manner as a lathe may be used to cut a pipe. Such cutting systems may encircle the pipe to perform a cutting operation. To this end, for example, known cutting systems for cutting pipes on-site may have a split frame design to fit around and/or may be secured to the pipe at the particular location. A cutting tool connected to the cutting apparatus may travel around the pipe and/or workpiece engaging the outer diameter of the pipe to make a circumferential cut into the pipe. Such a cutting system may also be known as a clamshell lathe.

Further, the clamshell lathe may be used for making a variety of cuts and/or bevels on a variety of pipes. The clamshell lathe may cut pipes to remove inoperative, malfunctioning, outdated and/or unwanted equipment from an installation.

The clamshell lathe may also be used for weld preparation on a pipe. Weld preparation may require that the end of the pipe is finished in a particular manner for subsequently performing a weld. Weld preparation may include cutting a clean end at the desired location of the pipe. Weld preparation may also include cutting a desired bevel at the end of the pipe. When the newly cut pipe is welded to the desired pipe and/or other equipment, the beveled edge provides an area of adherence for the weld to make a suitable connection.

The known cutting systems may experience and/or require large tool pressures when cutting the pipe. The pressures may be even greater when attempting to remove a relatively large amount of material from the pipe. The tool pressure may also be greater with a cut that may be performed at a greater speed. Also, the tool pressure may be greater with harder and/or thicker pipe materials. Such larger tool pressures may cause premature failures of the cutting tools and/or the motor driving the cutting apparatus. Point loads may also occur on the bits during cutting operations. Such point loads may also cause premature failures of the bits. Consequently, known systems may fail due to breakage of the cutting tools and/or bits due to high tool pressures. The drive motors may also fail due to the high loads.

Further, cutting times and other working times may be dependent upon many variables. For example, the level of training and/or experience of the operator may be a key factor. As with any task, an experienced operator may be able to operate the equipment more efficiently. Another factor may be the type of drive used. Hydraulic drives typically take 25% to 40% less time to complete a cut than air drives. However, hydraulic drives typically require a hydraulic power supply. Thus, hydraulic drives may not be as portable as air drives. Lastly, the type of form cutting and the location of the cutting operation may also have an effect upon the cutting time.

Thus, a need exists for a cutting system that may reduce point loads and/or provide a more equalized load than the loads experienced in known cutting systems. Also, a need exists for a cutting system that may reduce tool pressures when cutting a pipe. Further, a need exists for a cutting system capable of cutting pipes that may provide extended tool and/or bit life. Moreover, a need exists for a cutting system that may reduce the cutting time of a cutting operation.

SUMMARY OF THE INVENTION

The present invention generally relates to a cutting system, method and apparatus. More specifically, the present invention relates to a cutting apparatus having bits enabling the cutting apparatus to cut an object.

To this end, in an embodiment of the present invention, a bit apparatus is provided. The apparatus may have a body having a first end and a second end. The second end may be located opposite to the first end. The body may have a top side and a bottom side. The bottom side may be located opposite to the top side. The body may have a first side and a second side. The second side may be located opposite to the first side. The first side and the second side may be substantially perpendicular to the top side and the bottom side. The body may have a flank at the first end. The flank may have a surface on the top side. The body may have a shank at the second end. The shank may extend from the top side to the bottom side and may extend from the first side to the second side. A plurality of serrations may be formed in the flank extending from the first end to the shank.

In an embodiment, a groove may be located between the plurality of serrations.

In an embodiment, a first portion and a second portion of the flank are provided The first portion may define a first angle from the top side at the first end. The plurality of serrations may be formed in the first portion of the flank and extend within the first angle. The second portion of the flank may define a second angle. The plurality of serrations may be formed in the second portion of the flank and extend within the second angle.

In an embodiment, the plurality of serrations may have a relief angle extending from the first side to the second side.

In an embodiment, the plurality of serrations may be angled relative to the bottom of the body.

In an embodiment, the surface may be angled relative to the top side of the body.

In another embodiment of the present invention, a method for cutting a pipe using a cutting apparatus is provided. The pipe may have an inner diameter and an outer diameter. The outer diameter may have a surface. The method may have the steps of encircling the pipe with the cutting apparatus; attaching a first bit to the cutting apparatus; rotating the cutting apparatus around the pipe; and engaging the plurality of serrated teeth of the first bit with the surface of the pipe.

In an embodiment, the method may have the step of advancing the first bit in a direction from the outer diameter to the inner diameter of the pipe.

In an embodiment, each of the plurality of serrated teeth may have a length. The first bit may have a first end and a second end. The second end may be located opposite to the first end. The length of the plurality of serrated teeth may differ in size from the first end to the second end.

In an embodiment, the method may have the step of attaching a second bit to the cutting apparatus. The second bit may engage the surface of the pipe after the first bit.

In an embodiment, the method may have the step of attaching a second bit to the cutting apparatus. The second bit may bevel an end of the pipe to form a shape in the end of the pipe.

In an embodiment, the method may have the step of attaching a second bit to the cutting apparatus. The second bit removes material from the pipe.

In an embodiment, the method may have the step of severing the pipe from the outer diameter to the inner diameter.

In an embodiment, the method may have the step of beveling the pipe to form a shape on an end of the pipe.

In an embodiment, the method may have the step of forming a compound bevel on an end of the pipe.

In another embodiment of the present invention, a system for cutting an object is provided. The system may have a cutting apparatus. A first bit may be connected to the cutting apparatus. The first bit may have a plurality of serrations. A second bit may be connected to the cutting apparatus. The second bit may be connected to the cutting apparatus in a position opposite to the first bit. The second bit may be positioned to contact the object after the first bit contacts the object.

In an embodiment, the plurality of serrations may extend within a first angle and a second angle. The first angle and the second angle may be different.

In an embodiment, each of the plurality of serrations may have a length. The first bit may have a first end and a second end. The second end may be located opposite to the first end. The length of the plurality of serrations may differ in size from the first end to the second end.

In an embodiment, the cutting apparatus may be connected to the object and may rotate around the object.

In an embodiment, the first bit and the second bit may have a compound bevel.

It is, therefore, an advantage of the present invention to provide a system, a method and a cutting apparatus having cutting bits to cut an object.

Another advantage of the present invention is to provide a system, a method and a cutting apparatus for cutting an object which may reduce point loads and/or provide a more equalized load than the loads experienced in known cutting systems.

A further advantage of the present invention is to provide a system, a method and a cutting apparatus for cutting an object which may reduce tool pressures when cutting the object.

An advantage of the present invention is to provide a system, a method and a cutting apparatus for cutting an object which may reduce tool pressures when cutting a pipe.

Yet another advantage of the present invention is to provide a system, a method and a cutting apparatus for cutting an object which may reduce wear on the cutting bits relative to the wear experienced by bits in known cutting apparatuses.

A further advantage of the present invention is to provide a system, a method and a cutting apparatus for cutting an object which may provide extended tool and/or bit life.

Another advantage of the present invention is to provide a system, a method and a cutting apparatus for cutting an object which may reduce the time required to cut an object relative to the time required to cut an object using known cutting apparatuses.

A further advantage of the present invention is to provide a system, a method and a cutting apparatus for cutting an object which may operate using a hydraulic drive.

An advantage of the present invention is to provide a system, a method and a cutting apparatus for cutting an object which may operate using a pneumatic drive.

An advantage of the present invention is to provide a system, a method and a cutting apparatus for cutting an object which may operate using an electric drive.

Another advantage of the present invention is to provide a system, a method and a cutting apparatus for cutting an object which may automatically feed a bit into the object.

Yet another advantage of the present invention is to provide a system, a method and a cutting apparatus for cutting an object which may have a split frame to facilitate installation in certain applications.

A further advantage of the present invention is to provide a system, a method and a cutting apparatus for cutting an object which may reduce labor and/or time required to install and/or remove the apparatus relative to known cutting apparatuses.

Moreover, an advantage of the present invention is to provide a system, a method and a cutting apparatus for cutting an object which may simultaneously sever and bevel an in-line pipe.

A further advantage of the present invention is to provide a system, a method and a cutting apparatus for cutting an object which may provide weld preparation for an in-line pipe.

Another advantage of the present invention is to provide a system, a method and a cutting apparatus for cutting an object which may be controlled remotely.

Additional features and advantages of the present invention are described in, and will be apparent from, the detailed description of the presently preferred embodiments and from the drawings.

DETAILED DESCRIPTION OF THE PREFERRED EMBODIMENTS

Figure 1:
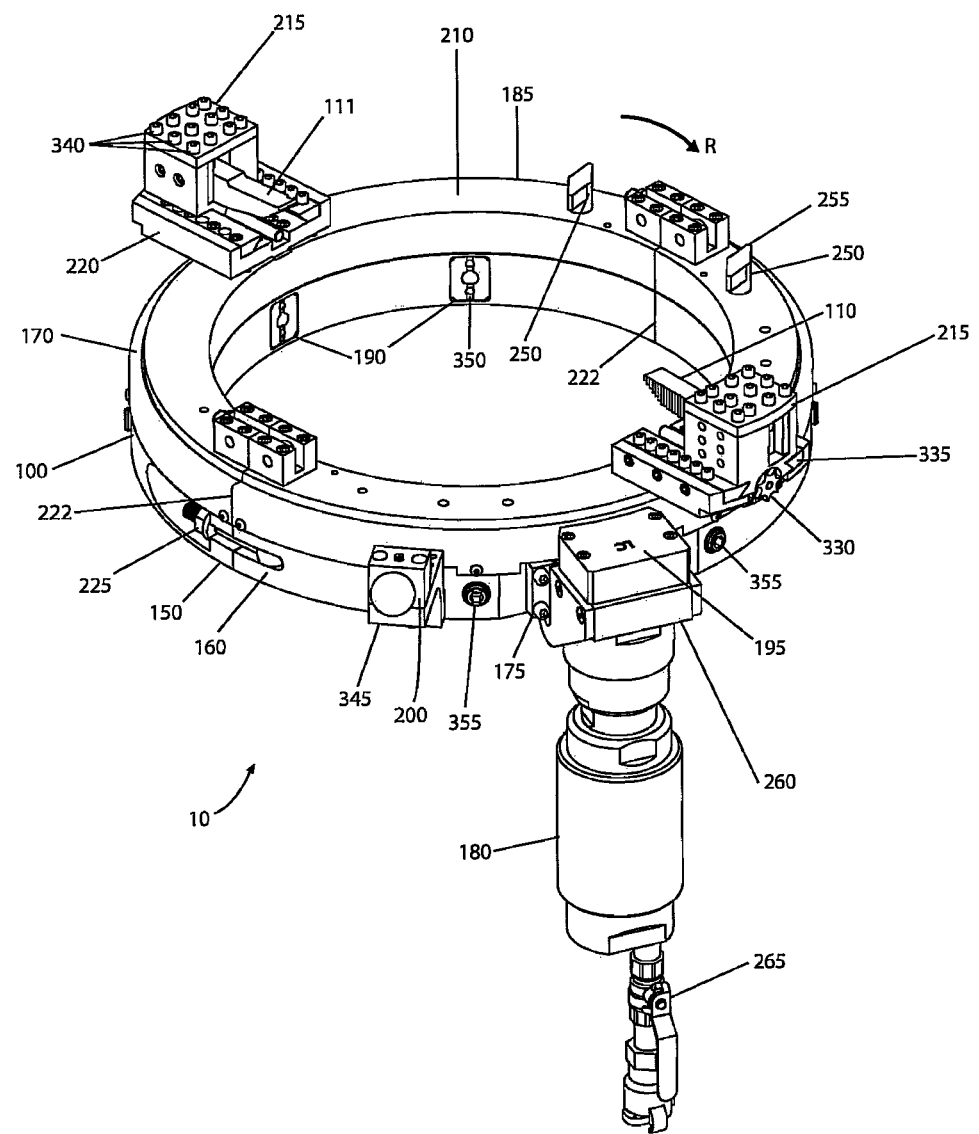
FIG. 1 illustrates a perspective view of a cutting apparatus in an embodiment of the present invention.

The present invention generally relates to a cutting system, method and apparatus. More specifically, the present invention relates to a cutting apparatus having bits to cut an object. To this end, in an embodiment of the present invention, a bit apparatus is provided. The apparatus may have a body having a first end and a second end. The body may have a top side, a bottom side, a first side and a second side. The first side and the second side may be substantially perpendicular to the top side and the bottom side. The body may have a flank at the first end. The flank may have a surface on the top side. The body may have a shank at the second end. The shank may extend from the top side to the bottom side and may extend from the first side to the second side. Serrations may be formed in the flank extending from the first end to the shank.

Referring now to the drawings wherein like numerals refer to like parts, the figures generally illustrate a cutting apparatus 10 in embodiments of the present invention. The cutting apparatus 10 may be a clamshell lathe. The cutting apparatus 10 may be a portable pipe lathe. Specifically, the Mactech Series LC clamshell lathes (manufactured by the assignee of this application, Mactech Inc., Red Wing, Minn.) may be such an example that may be used for numerous operations. For example, the cutting apparatus 10 may be designed to simultaneously sever and/or bevel in-line pipe, as well as machine any angle bevel simultaneously with the severing operation. However, the invention is not limited to clamshell lathes. A standard lathe or other cutting apparatus may be used and is considered to be within the scope of the invention.

Figure 2:
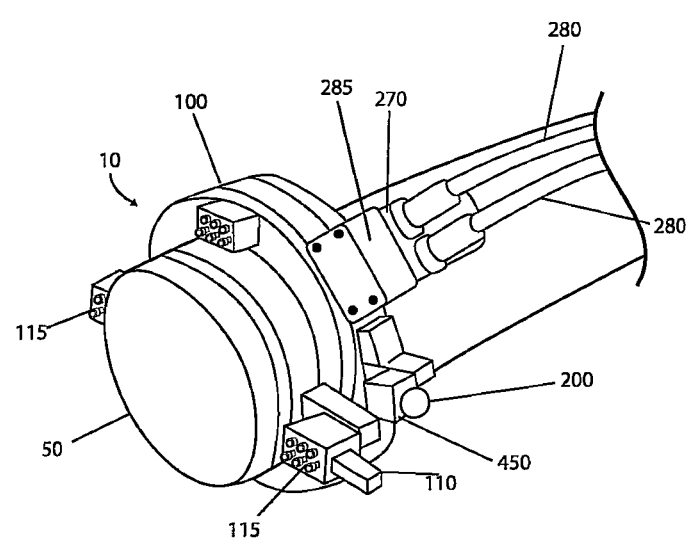
FIG. 2 illustrates a perspective view of a cutting apparatus in an embodiment of the present invention cutting a pipe.

The cutting apparatus 10 may have a frame 100. The frame 100 may be designed to permit the cutting apparatus 10 to be opened and fitted around in-situ pipe 50 or other round workpieces as shown in FIG. 2. The frame 100 may be split for easy installation as described in more detail hereafter. A first tool bit 110 and/or a second tool bit 111 may automatically feed and/or advance into the pipe 50 with each rotation of the cutting apparatus 10 to assure precise machining as also shown in FIG. 2.

Figure 14:
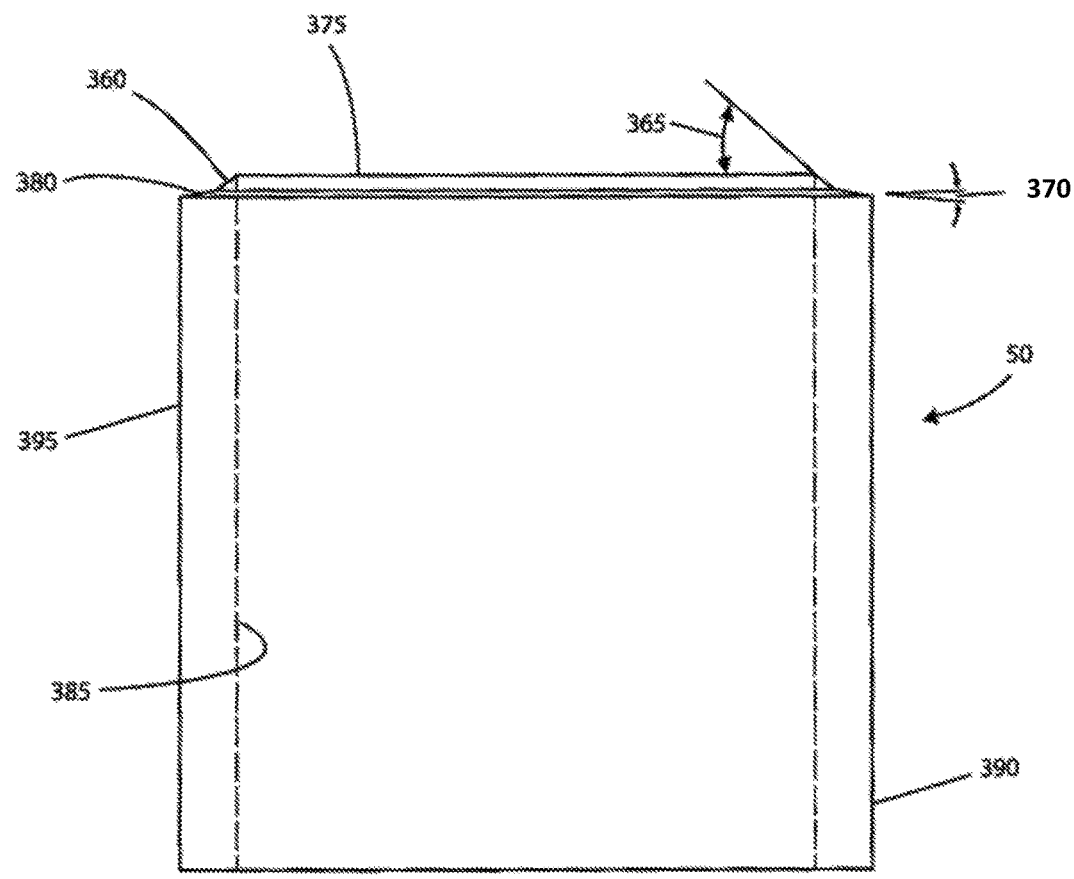
FIG. 14 illustrates a tool bit profile on a pipe cut by a cutting apparatus in an embodiment of the present invention.

The cutting apparatus 10 may perform numerous functions using various tool bits designed to perform a particular function. For example, the cutting apparatus 10 may sever in-line pipe, sever and bevel in-line pipe, sever and J-bevel in-line pipe, sever and double-bevel in-line pipe, counter bore an inner diameter (I.D.) of a pipe and/or remove socket welds. In particular, the cutting apparatus 10 may use the first tool bit 110 and/or the second tool bit 111 to prepare weld profiles on an end of a pipe 50 to facilitate butt welding of two round pipes 50 or other round components as shown in FIG. 14. Further, the cutting apparatus 10 may machine pipe formed of various materials, such as steel and various steel alloys, stainless steel, aluminum, copper-nickel, nickel-copper-iron and/or bronze. However, the present invention is not limited to cutting a particular type of pipe; other materials and objects may also be cut using the cutting apparatus 10.

In an embodiment, the cutting apparatus 10 may have several component parts. For example, the cutting apparatus 10 may have a split ring assembly 150 that may be disassembled for installation on and/or around in-line piping. In an embodiment, the frame 100 may be solid aluminum. The frame 100 may have a housing 160 and bearing mountings (not shown) for a rotating cutting head assembly 170, a mounting bracket 175 for a drive motor 180, a gear shield 185 and/or locator pads 190 for clamping the cutting apparatus 10 to the pipe 50. The housing 160 may provide a mounting surface for the locators 190, bearings (not shown), the drive motor 180 and a trip pin 200.

The housing 160 may also provide rigidity to the cutting apparatus during the machining process. A gear 210 may rotate on the housing 160. The gear shield 185 may be configured as a metal cover to shield the operator from the rotating gear 210. Tool blocks 215 and/or slides 220 may be mounted on the surface of the cutting head assembly 170. In an embodiment shown in FIG. 1, the two tool blocks 215 and the slides 220 are located approximately 180 degrees from each other on the cutting head assembly 170.

The cutting head assembly 170 may be equipped with the split ring gear assembly 150 that may be manufactured from steel, such as, for example, heat treated 4140 alloy steel. The split ring gear assembly 150 may align with split lines 222 of the frame 100 enabling the cutting apparatus 10 to split in half along the split lines 222. Swing bolts 225 may hold each part of the cutting apparatus 10 together. Loosening the swing bolts 225 may enable the operator to split the cutting apparatus 10 along the split lines 222 to open the cutting apparatus 10. The cutting apparatus 10 may encircle the pipe 50 to install the cutting apparatus 10 around closed loop piping.

The cutting head assembly 170 may run on precision bearings (not shown) that provide for both axial and radial force reactions that may be experienced in pipe machining. The bearings may be designed so that adjustments are not required. The gear 210 of the cutting head assembly 170 may be an integral spur gear. A lock pin 250 may be located on the face of the cutting assembly 150 to impinge upon the gear 210. The lock pin 250 may have a handle 255. In an embodiment, one lock pin 250 may be provided on each half of the cutting assembly 150. Each lock pin 250 may prevent the gear 210 from rotating while not in use.

Further, the cutting apparatus 10 may operate using different drives. For example, a pneumatic/air drive assembly 260 may be used as shown in FIG. 1. The air drive assembly 260 may include an air caddy (filter and lubricator, not shown) and/or a right angle or an in-line air drive 265. Also, the cutting apparatus 10 may operate using a hydraulic drive assembly 270 as shown in FIG. 2. In addition, the cutting apparatus 10 may operate using an electrical drive assembly (not shown).

In the embodiment shown in FIG. 1, the cutting apparatus 10 may have the air drive motor assembly 260 mounted to the frame 100. The air drive assembly 260 may include the air drive motor 180. The pneumatic/air motor 180 may be a type of drive motor that may use compressed air to drive a gearbox 195. The gearbox 195 may drive the cutting apparatus 10 for cutting and/or machining operations. The air drive motor 180 may be the in-line air drive 265 shown in FIG. 1 or a right angle air drive (not shown).

In an alternative embodiment shown in FIG. 2, the hydraulic drive assembly 270 may include a hydraulic drive motor 275. The hydraulic drive motor 275 may use hydraulic fluid (powered by a power supply, not shown) flowing through hydraulic lines 280 to the drive motor 275 to drive a gearbox 285. The gearbox 285 may drive the cutting apparatus 10 for cutting and/or machining operations. In the embodiment shown in FIG. 2, the cutting apparatus 10 may have the hydraulic drive assembly 270 mounted to the frame 100.

Either the air drive motor assembly 260 or the hydraulic drive assembly 270 may be configured with a pinion gear on a shaft with sealed ball bearings (not shown). The air drive motor 180 may have the mounting bracket 175 designed to accept the reaction torque generated by the air drive motor 180.

The cutting apparatus 10 may use certain tooling for performing severing and/or beveling operations on the pipe 50. For example, ½", ¾" and/or 1" high speed tool steel inserts of various sizes may be used, depending upon the machining operation desired. Such tool steel inserts may be the first tool bit 110 and/or the second tool bit 111. Any degree of bevel or counter bore may be provided. Moreover, standard preparation configurations may include right hand bits for beveling on the side of the cut on which the cutting apparatus 10 may be mounted and left hand bits for beveling on the opposite side of the cut.

Figure 3:
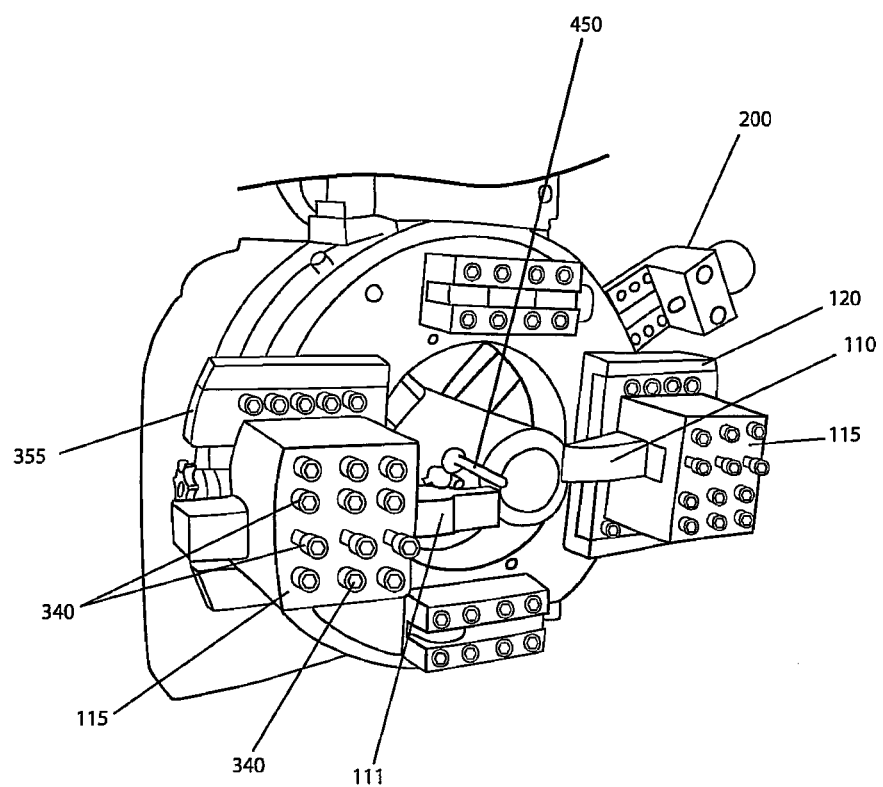
FIG. 3 illustrates a perspective view of a cutting apparatus in an embodiment of the present invention cutting a pipe.
Figure 4:
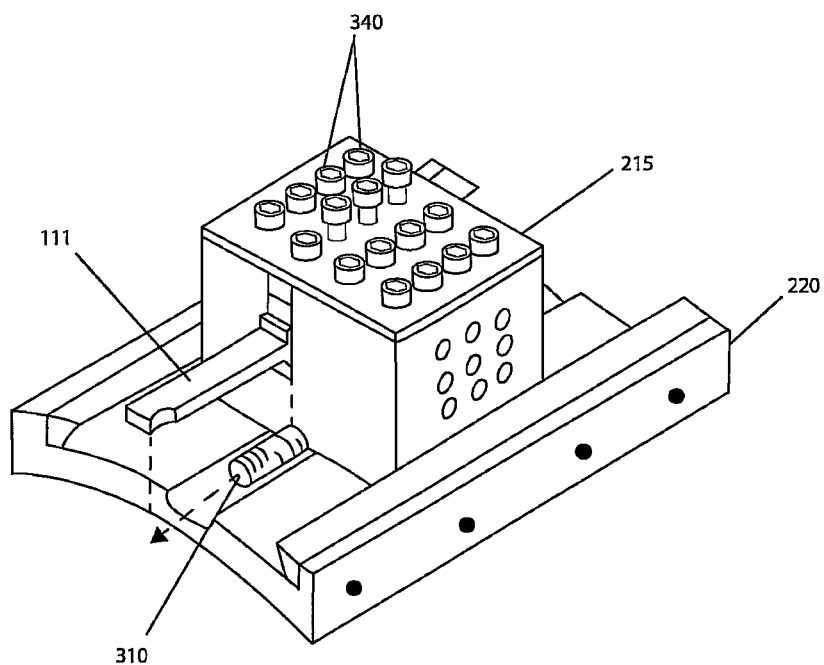
FIG. 4 illustrates a perspective view of a tool block and slide of a cutting apparatus in an embodiment of the present invention.
Figure 5:
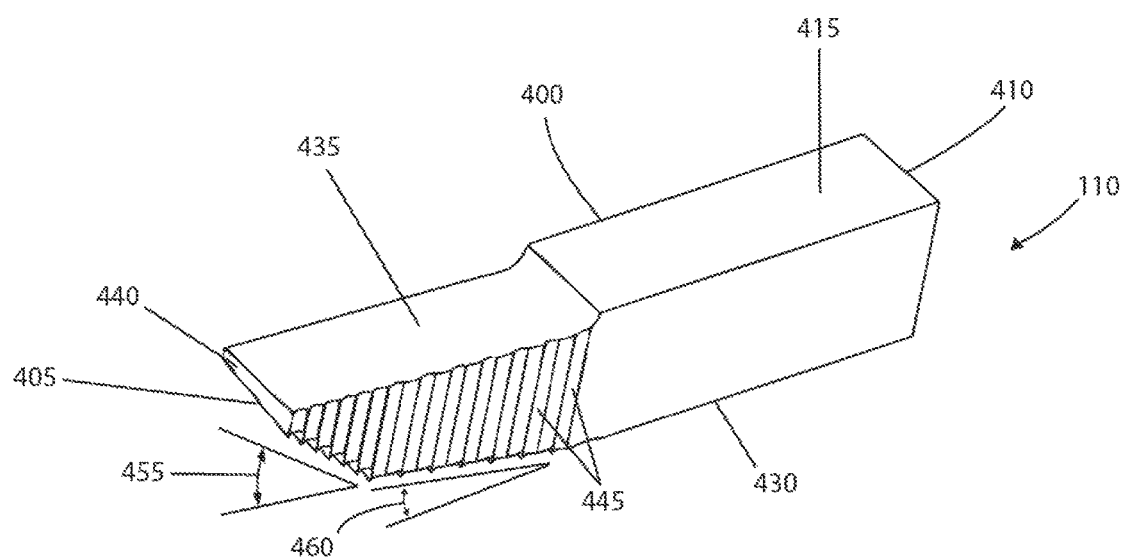
FIG. 5 illustrates a perspective view of a bit in an embodiment of the present invention.
Figure 6:
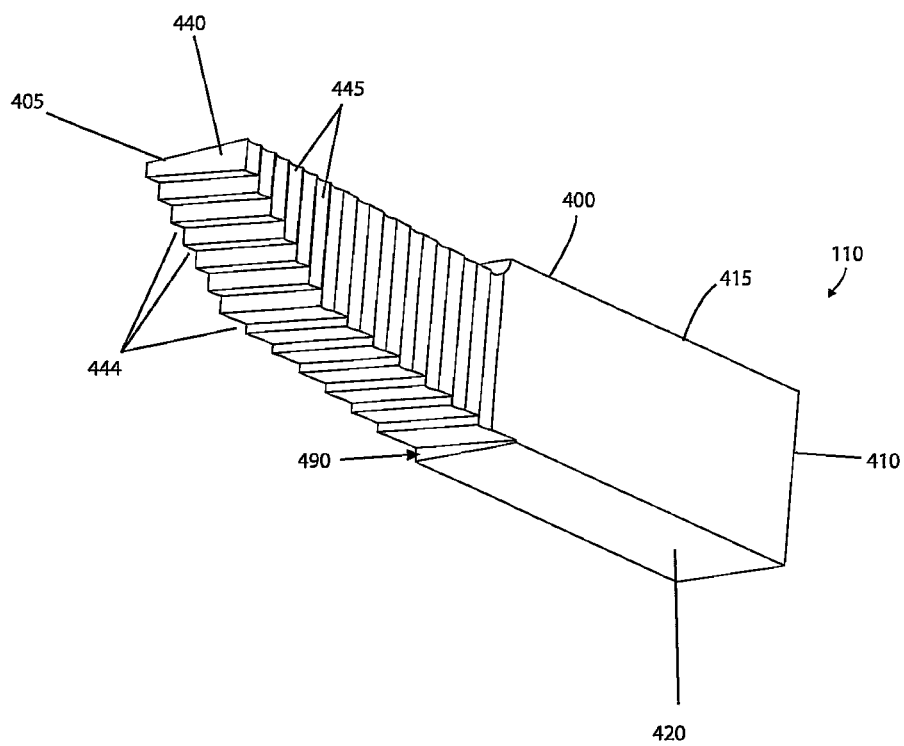
FIG. 6 illustrates a perspective view of a bit in an embodiment of the present invention.
Figure 7:
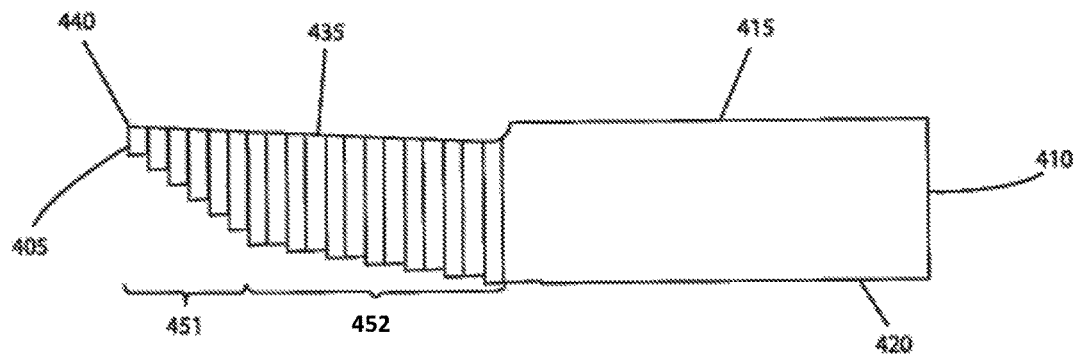
FIG. 7 illustrates a side view of a bit in an embodiment of the present invention.

As shown in FIGS. 1-4, the cutting apparatus 10 may have tool blocks 215 designed to hold the first tool bit 110 and/or the second tool bit 111. The tool block 215 and the slide 220 may position the first tool bit 110 and/or the second tool bit 111 at the desired location on the diameter of pipe during a cutting operation. In particular, FIG. 4 illustrates the tool block 215 and the slide 220 separate and apart from the cutting apparatus 10. A combination of the tool block 215 and the slide 220 may hold the first tool bit 110 and/or the second tool bit 111 during the machining process and may also feed the first tool bit 110 and/or the second tool bit 111 into the pipe 50. The tool block 215 may move along the slide 220 as the first tool bit 110 and/or the second tool bit 111 may be fed into the pipe 50 by a feed screw 310. For example, the feed screw 310 may be a threaded rod integrated with the tool block 215 and the slide 220. The feed screw 310 may also be connected to an automatic radial feed star wheel mechanism 330 shown in FIG. 1. The combination of the feed screw 310 and the star wheel mechanism 330 may enable the tool block 215 to advance along the slide 220. The first tool bit 110 and/or the second tool bit 111 may thereby feed and/or advance into the pipe 50 during a machining and/or cutting operation.

The tool block 215 may be mounted to the cutting head assembly 150 and may have the automatic radial feed star wheel mechanism 330 and adjustable tapered gibs 335. The star wheel mechanism 330 may be a seven point star or a nine point star.

In an embodiment, a feed rate may be controlled by the star wheel mechanism 330. As the cutting bit 110 advances into the pipe 50, the star wheel mechanism 330 may be incremented upon each revolution of the cutting apparatus 10. Therefore, the user may compensate for a size of the pipe 50, an amount and/or a type of material located in the wall of the pipe 50, and/or other conditions. Accordingly, the feed rate may be maintained at the predetermined feed rate and may stay constant during cutting and/or machining of the pipe 50.

Further, the tool block 215 may be designed to maintain the radial clearance equal to the frame diameter and have adjustable gibs 335 to adjust for wear. The cutting apparatus 10 may use either light duty (LD) or ultra strength (US) blocks. The tool blocks 215 and/or the slides 220 may have bolts 340 to securely hold the first tool bit 110 and/or the second tool bit 111. During a machining and/or cutting operation, the first tool bit 110 and/or the second tool bit 111 may experience high forces. The bolts 340 may securely hold the first tool bit 110 and/or the second tool bit 111 to withstand such forces. The trip pin 200 may be located on a fixed bracket 345 on the housing 160 of the cutting apparatus 10. The trip pin 200 may "trip" the star wheel 330 on the feed screw 310, enabling the feed screw 310 to rotate, which in turn may advance the tool block 215 down the tool slide 220 into the pipe 50.

Further, the cutting apparatus 10 may have the adjustable locator pads 190. The pads 190 may be actuated by turning set screws 350 located in the housing 160. The cutting apparatus 10 may have a set of four stackable locator pads 190, covering the standard range of pipe for each cutting apparatus 10. The stackable locator pads 190 may enable the operator to center the cutting apparatus 10 on the pipe 50. The four adjustable locator pads 190 may be actuated by jackscrews 355 from the outside of the frame 100. Additional sizes of extensions may be available for non-standard mounting needs.

The first tool bit 110 and/or the second tool bit 111 may be provided for severing, severing and double beveling, severing and beveling on the side of the cut on which the cutting apparatus 10 may be mounted (right hand), severing and beveling on the opposite side of the cut (left hand), counter boring, socket weld removal, etc.

Referring now to an embodiment of the first tool bit 110 shown in FIGS. 5-9, the first tool bit 110 may be configured as a sever bit and/or a bevel bit. In a machining operation, the first tool bit 110 may act as a parting bit to remove material from the pipe 50. Thus, the first tool bit 110 may sever the pipe 50. In addition, the first tool bit 110 may form a compound bevel 360 in the pipe 50 as shown in FIG. 14.

Referring specifically to FIG. 14, the bevel 360 may have a first angle 365 and/or a second angle 370. In an embodiment, the first angle 365 may be approximately 37 degrees, and the second angle 370 may be approximately 10 degrees. However, the invention is not limited to any particular size of angles. The first angle 365 and the second angle 370 may be selected for a particular application and/or bevel desired. Such a configuration profile may be conducive for weld preparation. For example, each of two pipes 50 may have their respective ends 375 machined with the profile shown in FIG. 14. The two pipe ends 375 may be butted together for welding the pipes 50 together in a butt weld. When butted together, for example, the bevel profile on the pipe ends 375 may form a channel 380 between the pipe ends 375 to allow for field welding of the pipes 50. The pipe 50 may also have an inner wall 385 and an outer wall 390. The bevel 360 may be formed at the end 375 of the pipe 50. The outer wall of the pipe 50 may have a surface 395. The surface 395 may be impinged upon by the first tool bit 110 and/or the second tool bit 111 during a cutting operation and/or a machining operation. To machine such a profile on the pipe end 375, for example, the first tool bit 110 may have a particular configuration.

Referring again to FIGS. 5-9, the first tool bit 110 may have a body 400. The body 400 may be made from tool steel or other suitable material known to one having ordinary skill in the art. The body 400 may be generally rectangular in shape. The body 400 may have a first end 405 and a second end 410 that may be located opposite to the first end 405. Further, the body 400 of the first tool bit 110 may have a top side 415 and a bottom side 420 that may be located opposite to the top side 415. The body 400 may also have a flank 425 at the first end 405 and a shank 430 at the second end 410. The flank 425 may have a face 435 on the top side 415 and a nose 440 at the first end 405. Moreover, the first tool bit 110 may have serrations 444 formed in the flank 425 extending from the nose 440 to the shank 430. The serrations 444 may increase in size from the first end 405 toward the second end 410.

During a cutting and/or machining operation, the serrations 444 may impinge upon the pipe 50 to remove material from the pipe 50. Each of the serrations 444 may engage the pipe 50 to remove material from the pipe 50. In particular, the serrations 444 may engage the surface 395 of the pipe 50 to remove material from the pipe 50. Thus, each of the serrations 444 may act like a single tool bit.

During the machining process, the first tool bit 110 may experience a tool pressure. Also, each of the serrations 444 may experience a tool pressure. However, the individual tool pressures experienced by each of the serrations 444 may be less individually than the tool pressure experienced by a tool bit without serrations. In certain machining processes and/or when machining pipes of certain materials, the tool pressures may be substantial and potentially damaging to the cutting apparatus 10 and/or the first tool bit 110. Thus, the reduced individual tool pressures on each of the serrations 444 may reduce the overall tool pressures experienced by the first tool bit 110. Also, the aggregated machining by each of the serrations 444 may effectively accumulate so that the first tool bit 110 may remove more material from the pipe 50 with less tool pressure in accordance with the advantages of the invention.

Also, a groove 445 may be formed between each of the serrations 444. The groove 445 may allow for material may be cut from the pipe 50 to be removed from the cutting area. Such cuttings 450 are illustrated in FIGS. 2 and 3. The cuttings 450 may spiral from the cutting area to provide a cleaner cutting operation.

The serrations 444 may also have different shapes, configurations, frequencies and/or sizes. In the illustrated embodiment shown in FIG. 7, the flank 425 may have a first portion 451 and/or a second portion 452. The first portion 451 of the flank 425 may subtend a first angle 455 from the nose 440 at the first end 405 of the first tool bit 110. The first angle 455 of the first tool bit 110 may be substantially the same as the first angle 365 of the bevel 360 shown in FIG. 14. For example, the first angle 455 of the first tool bit 110 and the first angle 365 of the bevel 360 may be approximately 37 degrees.

Similarly, the second portion 452 of the flank 425 may subtend a second angle 460. The second angle 460 of the first tool bit 110 may be substantially the same as the second angle 370 of the bevel 360 shown in FIG. 14. For example, the second angle 455 of the first tool bit 110 and the second angle 370 of the bevel 360 may be approximately ten degrees. In the embodiment shown, the serrations 444 formed in the first portion 451 of the flank 425 may extend substantially within the first angle 455. Further, the serrations 444 formed in the second portion 452 of the flank 425 may extend substantially within the second angle 460.

Figure 8:
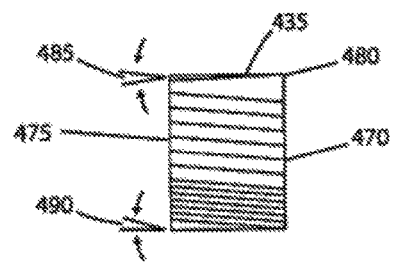
FIG. 8 illustrates an end view of a bit in an embodiment of the present invention.
Figure 9:
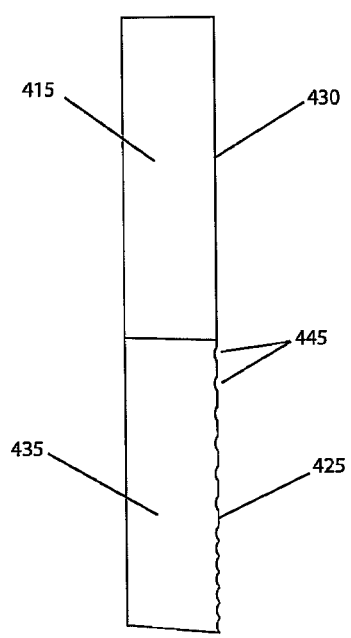
FIG. 9 illustrates a top view of a bit in an embodiment of the present invention.
Figure 10:
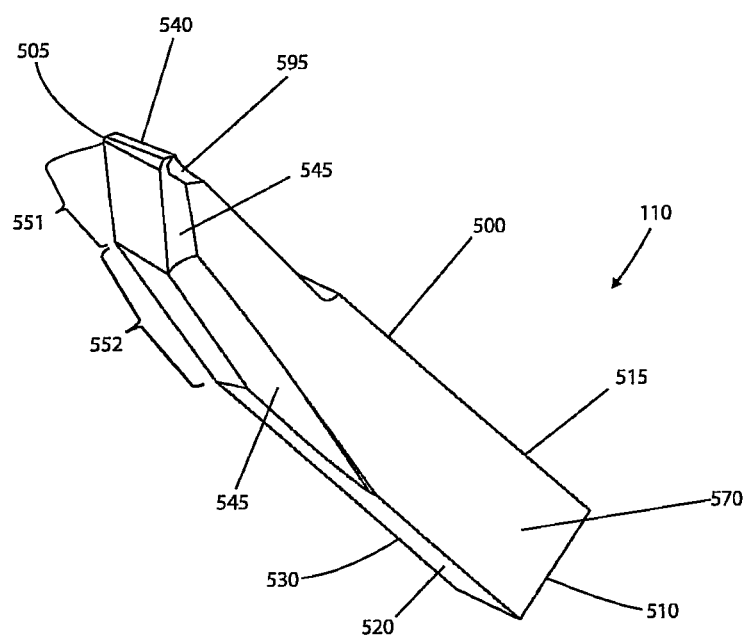
FIG. 10 illustrates a perspective view of a bit in an embodiment of the present invention.
Figure 11:
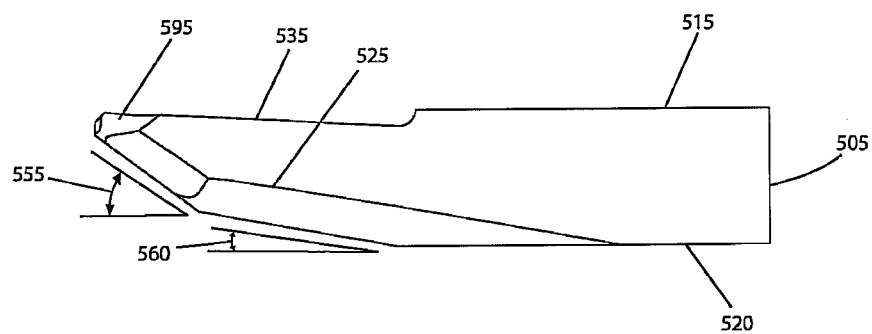
FIG. 11 illustrates a side view of a bit in an embodiment of the present invention.

Referring now to FIG. 8, the first end 405 of the first tool bit 110 is illustrated. The body 400 of the first tool bit 110 may have a first side 470 and a second side 475 that may be opposite to the first side 470. The first side 470 and the second side 475 may be substantially parallel to each other. The first side 470 may be the cutting side of the first tool bit 110 that may primarily contact the pipe 50 during a cutting and/or machining operation. In particular, a cutting point 480 on the first side 470 of the body 400 of the first tool bit 110 may primarily contact the pipe 50 during a cutting operation and/or a machining operation. In an embodiment, metal processing, heat treatments, coatings and/or metal hardening processes known to one having ordinary skill in the art may be used on the first tool bit 110 and/or the second tool bit 111 to harden the cutting point 480 and/or each of the serrations 444.

The face 435 on the top 415 of the first tool bit 110 subtends an angle 485 having a vertex at the cutting point 480. The angle 485 on the face 435 may act as a relief for the cuttings 450 to peel away from the cutting point 480 of the first tool bit 110 during the cutting operation and/or the machining operation. Also, the serrations 444 may also subtend an angle 490 from the first side 470 of the body 400 to the second side 475 of the body 400 of the first tool bit 110. The angle 490 may act as a relief for the cuttings 450 to peel away from the serrations 444 of the first tool bit 110 during a cutting and/or machining operation.

Referring now to an embodiment of the second tool bit 111 shown in FIGS. 10-13, the second tool bit 111 may be configured as a sever bit and/or a bevel bit. In a machining operation, the second tool bit 111 may act as a parting bit to remove material from the pipe 50. Thus, the second tool bit 111 may sever the pipe 50. In an embodiment, the second tool bit 500 may follow the first tool bit 400 during a cutting and/or machining operation. Thus, the second tool bit 111 may smooth the edges previously created by the serrations 444 of the first tool bit 110 during a cutting and/or machining operation during a rotation of the cutting apparatus 10 around the pipe 50. In addition, the second tool bit 111 may form the compound bevel 360 in the pipe 50 as shown in FIG. 14. The bevel 360 may have the first angle 365 and/or the second angle 370. In an embodiment, the first angle 365 may be approximately 37 degrees, and the second angle 370 may be approximately ten degrees. However, the invention is not limited to any particular size of angles. The first angle 365 and the second angle 370 may be selected for a particular application and/or bevel desired. Such a configuration profile may be conducive for weld preparation.

To machine such a profile on the pipe end 375, for example, the second tool bit 111 may have a particular configuration. The second tool bit 111 may have a body 500. The body 500 may be made from tool steel or other suitable material known to one having ordinary skill in the art. The body 500 may be generally rectangular in shape. The body 500 may have a first end 505 and a second end 510 that may be located opposite to the first end 505. Further, the body 500 of the second tool bit 111 may have a top side 515 and a bottom side 520 that may be located opposite to the top side 515. The body 500 may also have a flank 525 at the first end 505 and a shank 530 at the second end 510. The flank 525 may have a face 535 on the top side 515 and a nose 540 at the first end 505. During a cutting and/or machining operation, the second tool bit 111 may impinge upon the pipe 50 to remove material from the pipe 50.

The second tool bit 111 may also have different shapes, configurations, and/or sizes. In the illustrated embodiment, the flank 525 may have a first portion 551 and/or a second portion 552. The first portion 551 of the flank 525 may subtend a first angle 555 from the nose 540 at the first end 505 of the second tool bit 111. The first angle 555 of the second tool bit 111 may be substantially the same as the first angle 365 of the bevel 360 shown in FIG. 14. For example, the first angle 555 of the second tool bit 111 and the first angle 365 of the bevel 360 may be approximately 37 degrees.

Similarly, the second portion 552 of the flank 525 may subtend a second angle 560. The second angle 560 of the second tool bit 111 may be substantially the same as the second angle 370 of the bevel 360 shown in FIG. 14. For example, the second angle 555 of the second tool bit 111 and the second angle 370 of the bevel 360 may be approximately ten degrees. In the embodiment shown, a groove 545 may be formed in the flank 525. The groove 545 may be formed in the first portion 551 and/or the second portion 552 of the flank 525. Further, the groove 545 may allow for material cut from the pipe 50 to be removed from the cutting area. Such cuttings 450 are illustrated in FIGS. 2 and 3. The cuttings 450 may spiral from the cutting area to provide a cleaner cutting operation.

Figure 12:
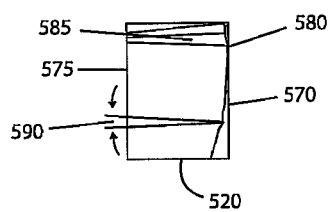
FIG. 12 illustrates an end view of a bit in an embodiment of the present invention.

Referring now to FIG. 12, the first end 505 of the second tool bit 111 is illustrated. The body 500 of the second tool bit 111 may have a first side 570 and a second side 575 that may be opposite to the first side 570. The first side 570 and the second side 575 may be substantially parallel to each other. The first side 570 may be the cutting side of the second tool bit 111 that may primarily contact the pipe 50 during a cutting operation and/or a machining operation. In particular, a cutting point 580 on the first side 570 of the body 500 of the second tool bit 111 may primarily contact the pipe 50 during a cutting operation and/or a machining operation. The face 535 on the top 515 of the second tool bit 111 subtends an angle 585 having a vertex at the cutting point 580. The angle 585 on the face 535 may act as a relief for the cuttings 450 to peel away from the cutting point 580 of the second tool bit 111 during a cutting operation and/or a machining operation. Also, the flank 525 may also subtend an angle 590 from the first side 570 of the body 500 to the second side 575 of the body 500 of the second tool bit 111. The angle 590 may act as a relief for the cuttings 450 to peel away from the second tool bit 111 during a cutting and/or machining operation.

Figure 13:
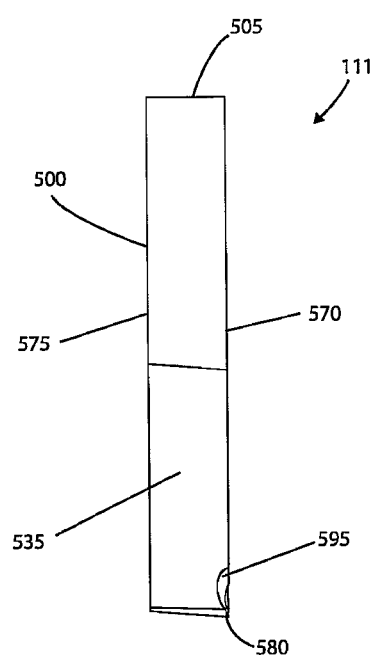
FIG. 13 illustrates a top view of a bit in an embodiment of the present invention.

Referring now to FIG. 13, the top 515 of the second tool bit 111 is illustrated. The body 500 of the second tool bit 111 may have a relief groove 595 on the face 535 of the top 515 of the second tool bit 111. The relief groove 595 may act as a relief for the cuttings 450 to peel away from the cutting point 580 and/or the second tool bit 111 during a cutting operation and/or a machining operation.

Of course, different shapes and/or sizes of the tool bit 110 and/or the second tool bit 111 are possible, and the present invention is not limited to the specific shapes and/or sizes disclosed. One skilled in the art may determine that another size may be used without departing from the scope of the present invention.

Cutting capacity of the cutting apparatus 10 may be determined by the maximum depth of cut of the first tool bit 110 and/or the second tool bit 111. For example, standard size tooling for an operation having a sever machining operation and/or a bevel machining operation may enable an operator to cut a pipe having a 2.15" wall. For heavier wall piping, larger tooling may be required to machine the desired wall size.

In an embodiment, a method for cutting and/or machining the pipe 50 and/or other round object using the cutting apparatus 10 of the invention may be provided. The method may encircle the pipe 50 with the cutting apparatus 10 as shown in FIGS. 2 and 3. As previously described, the cutting apparatus 10 may separate to encircle the pipe 50. The cutting apparatus 10 may then be closed around the pipe 50, secured together and adjusted for proper operation. Further, the pipe 50 may have the inner wall 385 and the outer wall 390. Further, the outer wall of the pipe 50 may have the surface 395. Also, the method may attach the first tool bit 110 to the cutting apparatus 10. The first tool bit may have the serrations 444. The method may rotate the cutting apparatus 10 around the pipe 50. The cutting apparatus 10 may rotate in a clockwise direction as indicated by arrow R shown in FIG. 1. Finally, the method may engage the serrations 444 of the first tool bit 110 with the surface 395 of the pipe 50. The method may advance the first tool bit 110 in a direction from the outer wall 390 to the inner wall 385 of the pipe 50. The method may attach the second tool bit 111 to the cutting apparatus 10. The second tool bit 111 may follow the first tool bit 110 during a cutting operation and/or a machining operation. The second tool bit 111 may form a smooth bevel on the pipe 50.

Thus, the cutting and/or machining process in an embodiment may have the steps of:
(1) encircling the pipe 50 with the cutting apparatus 10;
(2) attaching the first tool bit 110 to the cutting apparatus 10;
(3) rotating the cutting apparatus 10 around the pipe 50; and
(4) engaging the plurality of serrations 444 of the first tool bit 110 with the surface 395 of the pipe 50.

Moreover, operation of the cutting apparatus 10 may be controlled remotely in an embodiment. Operation of the cutting apparatus 10 may be controlled remotely, such as, for example, by a ROV interface as known to one having ordinary skill in the art. For example, the cutting apparatus 10 may be located on a job site to cut and/or machine the pipe 50, and the cutting apparatus 10 may be controlled from a remote location relative to the job site or at a different location on the job site.

Other variations and/or geometric configurations which are known to one having ordinary skill in the art are possible and are deemed to be within the scope of this disclosure. The materials used for the components of the cutting apparatus 10 may be selected from any suitable material to perform the desired function for operation of the cutting apparatus 10. The materials must also be capable of withstanding environmental conditions that may be encountered. Considerations of performance and/or reliability are also important in the selection of the material. Other materials which are known to one having ordinary skill in the art may be selected and are deemed to be within the scope of this disclosure. Further, known cutting techniques that are suitable for the type of material selected are considered to be within the scope of this disclosure.

As disclosed above, the cutting apparatus 10 may also be manufactured in numerous embodiments. The various embodiments of the cutting apparatus 10 may have additional components which may provide enhanced functionality of the cutting apparatus 10.

Moreover, the present invention is not limited to the specific arrangement of the components of the cutting apparatus 10 illustrated in the figures. It should be understood that various changes and modifications to the presently preferred embodiments described herein will be apparent to those having ordinary skill in the art. Such changes and modifications may be made without departing from the spirit and scope of the present invention and without diminishing its attendant advantages. It is, therefore, intended that such changes and modifications be covered by the appended claims.

We claim:

1. A bit apparatus comprising:
a shank having a first end and a second end, wherein the second end is located opposite to the first end and further having a top side and a bottom side, wherein the bottom side is located opposite to the top side and further having a first side and a second side, wherein the second side is located opposite to the first side, wherein the first side and the second side are substantially perpendicular to the top side and the bottom side;

a flank extending longitudinally from the first end of the shank to a flank nose, wherein the flank has a top surface, a first side, a second side and a first portion extending longitudinally from the flank nose toward the first end of the shank, wherein the first portion subtends at a first angle from the flank nose, and further wherein the flank has a second portion extending longitudinally from the first portion to the first end of the shank, wherein the second portion subtends at a second angle from the flank nose, and wherein the first portion and the second portion each is further angled with respect to a width of the top surface; and a plurality of serrations extending transversely across the flank from the first side to the second side of the flank, wherein the serrations span longitudinally from the flank nose to the first end of the shank, wherein the serrations increase in size from the flank nose toward the shank.

2. The apparatus of claim 1 further comprising a groove between the plurality of serrations on the first side and the second side of the flank.

3. The apparatus of claim 1, wherein the first portion defines a first angle from the top surface of the flank, wherein the plurality of serrations are formed in the first portion of the flank and extend within the first angle, and further wherein the second portion of the flank defines a second angle from the top surface of the flank, wherein the plurality of serrations are formed in the second portion of the flank and extend within the second angle.

4. The apparatus of claim 1 wherein the plurality of serrations have a relief angle extending from the first side to the second side of the flank.

5. The apparatus of claim 1 wherein the plurality of serrations are angled related to the bottom side of the shank.

* * * * *